United States Patent
Eggleton et al.

(10) Patent No.: US 6,529,676 B2
(45) Date of Patent: Mar. 4, 2003

(54) WAVEGUIDE INCORPORATING TUNABLE SCATTERING MATERIAL

(75) Inventors: Benjamin John Eggleton, Summit, NJ (US); Peter Mach, Berkeley Heights, NJ (US); John A. Rogers, New Providence, NJ (US); Paul Stephen Westbrook, Chatham, NJ (US); Pierre Wiltzius, Millington, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 36 days.

(21) Appl. No.: 09/733,182

(22) Filed: Dec. 8, 2000

(65) Prior Publication Data

US 2002/0071646 A1 Jun. 13, 2002

(51) Int. Cl.$^7$ ................................................. G02B 6/16
(52) U.S. Cl. ........................... 385/142; 385/40; 385/41; 385/125; 385/141
(58) Field of Search ........................... 385/2, 8, 40–42, 385/123, 125, 127, 121, 141–145

(56) References Cited

U.S. PATENT DOCUMENTS

| | | | |
|---|---|---|---|
| 5,361,320 A | * 11/1994 | Liu et al. | 385/143 |
| 5,550,940 A | 8/1996 | Vengsarkar et al. | 385/28 |
| 5,647,039 A | 7/1997 | Judkins et al. | 385/37 |
| 5,703,978 A | 12/1997 | DiGiovanni et al. | 385/37 |
| 5,757,540 A | 5/1998 | Judkins et al. | 359/341 |
| 5,802,236 A | 9/1998 | DiGiovanni et al. | 385/127 |
| 5,889,907 A | * 3/1999 | Matsumoto et al. | 385/40 |
| 5,937,115 A | 8/1999 | Domash | 385/16 |
| 5,999,671 A | 12/1999 | Jin et al. | 385/37 |
| 6,011,886 A | 1/2000 | Abramov et al. | 385/37 |
| 6,050,109 A | 4/2000 | Kosinski et al. | 65/385 |
| 6,058,226 A | 5/2000 | Starodubov | 385/12 |
| 6,078,709 A | 6/2000 | Abramov et al. | 385/37 |
| 6,104,852 A | * 8/2000 | Kashyap | 385/123 |
| 6,111,999 A | 8/2000 | Espindola et al. | 385/37 |

FOREIGN PATENT DOCUMENTS

| | | | |
|---|---|---|---|
| EP | 0 762 179 A2 | 3/1997 | G02F/1/1333 |
| WO | WO 99/09440 | 2/1999 | G02B/6/12 |

OTHER PUBLICATIONS

Amundson, K. et al., "Morphology and electro–optic properties of polymer–dispersed liquid–crystal films", *Physical Review E*, vol. 55, No. 2 (1997).

Birks, T.A., et al., "Endlessly single–mode photonic crystal fiber", *Optics Letters*, vol. 22, No. 13, pp. 961–963 (1997).

Rogers, J.A. et al., "Dual on–fiber thin–film heaters for fiber gratings with independently adjustable chirp and wavelength", *Optics Letters*, vol. 24, No. 19, pp. 1328–1330 (1999).

Eggleton, B.J. et al., "Grating resonances in air–silica microstructured optical fibers", *Optics Letters*, vol. 24, No. 21, pp. 1460–1462 (1999).

(List continued on next page.)

*Primary Examiner*—Rodney Bovernick
*Assistant Examiner*—Jerry T Rahll
(74) *Attorney, Agent, or Firm*—Stephen M. Gurey

(57) ABSTRACT

A unique waveguide structure is provided in which the waveguide contains individual scattering elements that are capable of being tuned to provide local refractive index variations, e.g., on a micron scale—which is on the order of wavelengths typically used for communication system. According to the invention, the waveguide contains a core region, a cladding region, and a solid or liquid material having the tunable scattering elements dispersed therein, where the material is disposed within the core and/or cladding regions, and/or on the exterior of the cladding region. Useful scattering elements include, for example, liquid crystals dispersed in a polymer (polymer-dispersed liquid crystals—PDLC) or electrophoretic particles dispersed in a liquid medium.

19 Claims, 7 Drawing Sheets

OTHER PUBLICATIONS

Eggleton, B.J. et al., "Electrically Tunable Power Efficient Dispersion Compensating Fiber Bragg Grating", *IEEE Photonics Technology Letters*, vol. 11, No. 7, pp. 854–856 (1996).

Westbrook, P.S. et al., "Cladding–Mode Resonances in Hybrid Polymer–Silica Microstructured Optical Fiber Gratings", *IEEE Photonics Technology Letters,.* vol. 12, No. 5, pp. 495–497 (2000).

Rogers, J.A. et al., "Temperature stabilised operation of tunable fibre grating devices that use distributewd on–fibre thin film heaters", *Electronics Letters*, vol. 35, No. 23, pp. 2052–2053 (1999).

Abamov, A.A., et al., "Electrically Tunable Efficient Broad–Band Fiber Filter", *IEEE Photonics Technology Letters*, vol. 11, No. 4, pp. 445–447 (1999).

Takizawa, K. et al., "Polarization–independent optical fiber modulator by use of polymer–dispersed liquid crystals", *Applied Optics*, vol. 37, No. 15, pp. 3181–3189 (1998).

Jeong, Y. "Electrically Controllable Long–Period Liquid Crystal Fiber Gratings", *IEEE Photonics Technology Letters*, vol. 12, No. 5, pp. 519–521 (2000).

Abramov, Eggleton, Rogers, Espindola, Hale, Windeler, and Strasser, "Electrically Tunable Efficient Broad–Bank Fiber Filter", *IEEE Photonics Technology Letters*, vol. 11, No. 4, pp. 445–447 (Apr. 1999).

* cited by examiner

WAVEGUIDE INCORPORATING TUNABLE SCATTERING MATERIAL

BACKGROUND OF THE INVENTION

1. Field of the Invention

The invention relates to optical communications system having waveguides or waveguide devices with tunable properties.

2. Discussion of the Related Art

As the prevalence of optical communications systems has increased, numerous techniques for modifying and/or controlling propagation of light through waveguides have been developed. Such techniques have included incorporation of photosensitive materials into the core of single mode optical fibers, to allow formation of periodic refractive index modulations. Such modulations enabled fiber Bragg gratings (FBG) as well as long period gratings (LPG), which have become widely used for a variety of applications, including reflection of selected frequency bands and gain flattening. Continued research led to so-called microstructured fiber, in which the fiber contains axially oriented elements—typically capillary air holes—that provide a variety of useful properties such as photonic crystal characteristics, supercontinuum generation, and soliton generation. (See, e.g., B. J. Eggleton et al., "Cladding-Mode-Resonances in Air-Silica Microstructure Optical Fibers," *Journal of Lightwave Technology*, Vol. 18, No. 8 (2000); J. C. Knight et al., "Anomalous Dispersion in Photonic Crystal Fiber," *IEEE Photonics Technology Letters*, Vol. 12, No. 7 (2000); J. Ranka et al., "Visible continuum generation in air-silica microstructure optical fibers with anomalous dispersion at 800 nm," *Optics Letters*, Vol. 25, No. 1 (2000); and U.S. Pat. Nos. 5,907,652 and 6,097,870.) Such microstructured fiber also allows adjustment of effective refractive index profiles to attain, for example, decoupling of interior cladding modes from the influence of the material surrounding the fiber. Combinations of microstructured fiber with in-fiber gratings have also shown interesting results. (See, e.g., B. J. Eggleton et al., "Grating Resonances in Air-Silica Microstructured Optical Fibers," *Optics Letters*, Vol. 24, No. 21, 1460 (1999); P. S. Westbrook et al., "Cladding-Mode Resonances in Hybrid Polymer-Silica Microstructured Optical Fiber Gratings," *IEEE Phot. Tech. Lett.*, Vol. 12, No. 5, 495 (2000).)

More recent efforts have focused on attaining real-time tunability of the properties of gratings and/or microstructured fiber. For example, in J. A. Rogers et al., "Temperature stabilised operation of tunable fibre grating devices that use distributed on-fiber thin film heaters," *Electronics Letters*, Vol. 35, No. 23, 2052 (1999), the authors describe a technique for thermally tuning the properties of fiber Bragg gratings or long period gratings. Specifically, a thin-film resistive heater is formed on the exterior of the fiber, and electrical control is used to tune and stabilize the grating properties. In Jeong et al., "Electrically Controllable Long-Period Liquid Crystal Fiber Gratings," *IEEE Phot. Tech. Lett.*, Vol. 12, No. 5, 519 (2000), the authors describe a fiber having a liquid crystal-filled core. A combed electrode, i.e., an electrode having periodic gaps, is used to selectively align the liquid crystals at the periodic distance of the electrode. The result is essentially a long period grating capable of being turned on and off (see FIG. 2 of the paper). In another approach, reflected in K. Takizawa et al., "Polarization-independent optical fiber modulator by use of polymer-dispersed liquid crystals," *Applied Optics*, Vol. 37, No. 15, 3181 (1998), a ferrule, which has polymer-dispersed liquid crystals therein, is placed between two fibers to provide adjustable modulation of a propagating signal.

A variety of references report use of a second material either within a microstructured fiber or surrounding a fiber, where the second material is capable of undergoing a bulk refractive index change in response to external stimuli, e.g., heat. For example, in U.S. Pat. No. 6,058,226 to Starodubov, a fiber with a LPG therein is surrounded by a second material that undergoes a bulk index change in response to applied or encountered external stimuli. The resulting changes in the bulk refractive index of this second material alters the propagation and coupling of the core/cladding modes. U.S. Pat. No. 5,361,320 to Liu et al. discloses a fiber having a liquid crystal core or cladding, similar to what is disclosed in Jeong et al., *supra*. Liu discloses adjusting the orientation of all the liquid crystals, by electrical control, to provide a bulk index change in the material, this change altering the properties of the fiber core or cladding. In A. A. Abramov et al., "Electrically Tunable Efficient Broad-Band Fiber Filter," *IEEE Phot. Tech. Lett.*, Vol. 11, No. 4, 445 (1999), a microstructured fiber having a long period grating formed-therein is imbibed with, or surrounded by, a polymer having a temperature-sensitive-index of refraction. A resistive heating film is formed on the exterior of the fiber, and allows tuning of the bulk refractive index of the polymer. By changing the index of the polymer, the properties of the LPG, e.g., the resonance wavelength, can be controlled. Co-assigned U.S. Pat. No. 6,111,999 to Espindola et al. uses a similar approach. Specifically, a fiber having a grating written therein is provided with one or more variable refractive index regions. These regions contain a material having an adjustable bulk refractive index, such that adjusting the index of the regions provides a desired change in the properties of the grating.

While these numerous approaches to tunable and/or microstructured fiber and fiber gratings exist, further improvements and enhancements are always desired.

SUMMARY OF THE INVENTION

The invention provides a unique waveguide structure in which the waveguide contains individual scattering elements that are capable of being tuned to provide local refractive index variations, e.g., on a micron scale—which is on the order of wavelengths typically used for communication system. (Micron scale indicates that the individual elements provide tunable local index changes covering a distance of 0.1 to 10 $\mu$m.) For example, for a system containing a source that launches one or more wavelengths into the waveguide, the scattering elements will have a size typically ranging from 0.1 to 10 times such wavelengths, typically 0.3 to 3 times such wavelengths. (Generally, the tunable local index changes are made on a length scale that provides the maximum scattering effect at the signal system's wavelength of interest.)

According to the invention, the waveguide contains a core region, a cladding region, and a solid or liquid material having the tunable scattering elements dispersed therein, where the material is disposed within the core and/or cladding regions, and/or on the exterior of the cladding region. Useful scattering elements include, for example, liquid crystals dispersed in a polymer (polymer-dispersed liquid crystals—PDLC) or electrophoretic particles dispersed in a liquid medium. (As used herein, a material having tunable scattering elements dispersed therein indicates, for example, any mixture, dispersion, suspension, solution, etc. that provides a material with distinct tunable elements or regions that provide local variation in refractive index.)

As noted above, several groups have explored the use in waveguides of materials capable of having their refractive index varied by external controls. However, these approaches, reflected for example in U.S. Pat. No. 6,058,226, U.S. Pat. No. 5,361,320, A. A. Abrambv et al., *supra*, and U.S. Pat. No. 6,111,999, rely on changing the bulk refractive index of the entire region of the waveguide in which the material is located. By contrast, the invention uses individual scattering elements that provide tunable local variations in the refractive index, such that the nature of the waveguide's scattering cross-section can be adjusted. For example, it is possible to tune the scattering elements such that their refractive index (as encountered by propagating light) is substantially matched to the surrounding material in which they are dispersed. In such a case, the scattering cross-section is low. It is also possible to tune the scattering elements such that their refractive index is different from the surrounding material. In this case, the elements will induce scattering of the propagating light, which, as discussed below, provides some desirable effects.

One embodiment, which illustrates these features of the invention, is shown in FIGS. 5A and 5B. The waveguide is a microstructured fiber having six capillary air holes 58 surrounding a germanium-doped silica core region 52, in which a long period grating 56 is formed. The air holes are filled with a polymer-dispersed liquid crystal precursor and cured to induce formation of PDLC 60, i.e., phase separation and LC droplet formation. A thin metal film 62 is deposited on one side of the fiber, with wire leads attached to the film. With no current applied, the local refractive index profile within the LC droplets varies significantly with respect to the surrounding polymer, i.e., the LC are at a high scattering state, which causes the core mode/cladding mode coupling (induced by the LPG) to be somewhat inhibited. If a current is applied to the metal film to bring the fiber temperature to, the transition point at which the LC substantially match the refractive index of the surrounding polymer, i.e., the LC are at a low scattering state, the core mode/cladding mode coupling increases such that the LPG effects are increased.

DETAILED DESCRIPTION OF THE INVENTION

The scattering elements according to the invention are any element capable of being dispersed in a liquid or solid medium, and capable of providing tunable, local refractive index variations, e.g., of being tuned to change the scattering cross-section encountered by propagating light. Useful scattering elements include liquid crystal droplets dispersed in a polymer matrix (referred to as polymer-dispersed liquid crystals or PDLC) and electrophoretic particles. (In the case of electrophoretic particles, the position, rather than the orientation, of the scattering elements is altered to change the waveguide properties.) Other elements are also possible.

Figure 1A:
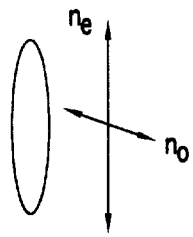
FIG. 1 illustrates tunability of polymer-dispersed liquid crystals to provide local variations in refractive index.

PDLCs are well-known in the art. (See, e.g., P. Drzaic, *Liquid Crystal Dispersions*, Ch. 4, World Scientific, River Edge (1998); K. Amundson et al., "Morphology and Electro-Optic Properties of Polymer-dispersed Liquid-Crystal Films," *Physical Review E*, Vol. 55, 1646 (1997).) A liquid-crystal mesophase of interest in the invention is the nematic phase, in which rod-like (e.g., 30 Å-long), organic liquid-crystal molecules tend to align along a common direction (so-called director), while possessing no overall translational order. These molecules are birefringent, having an extraordinary refractive index ($n_e$) along their long axis, and ordinary refractive index ($n_o$) along the orthogonal short axes, as shown in FIG. 1A. Typical refractive index values are $n_e$~1.7 and $n_o$~1.5, although materials with lower birefringence, and lower $n_o$, are commercially available. A dispersion of liquid crystal inside a polymer is typically formed by mixing the liquid-crystal material with a photo-curable monomer at an appropriate volume ratio, and then curing the monomer with UV radiation. The cross-linking of the polymer leads to phase separation, trapping the liquid crystal in droplets, the sizes of which are capable of being adjusted by suitable choice of volume fractions and curing intensities. Typical liquid crystal droplet sizes in PDLC materials range from a few hundred nanometers to several microns. The separation between the droplets also depends on volume fraction and curing parameters, and generally ranges from separations similar to droplet diameter to cases where droplets are separated by only very narrow polymer walls of thickness much less than droplet size. An example of a useful scattering configuration for the invention is of tightly spaced, approximately spherical, droplets of a diameter of about 1.5 μm size.

Within a PDLC, the refractive index of the cured polymer ($n_p$) is optionally chosen to closely match $n_o$. Illustrations of relevant molecular parameters, PDLC geometry, and control techniques are illustrated in FIGS. 1B to 1E. As reflected in FIG. 1B, at a temperature within the LC nematic phase, and in the absence of an aligning electric field, the LC molecules 14 typically adopt a so-called bipolar configuration within the droplets 12. Light incident on the PDLC therefore essentially sees droplets 12 whose effective refractive index does not match that of the polymer matrix 10, i.e., the droplets 12 provide local variations in refractive index, resulting in relatively high scattering. By raising the temperature to bring the LC 14 into their isotropic phase, shown in FIG. 1C, the effective index of the LC material 14 within the droplets 12 is brought much closer to $n_p$. Therefore, the PDLC material is made less scattering and more transparent.

Figure 1B:
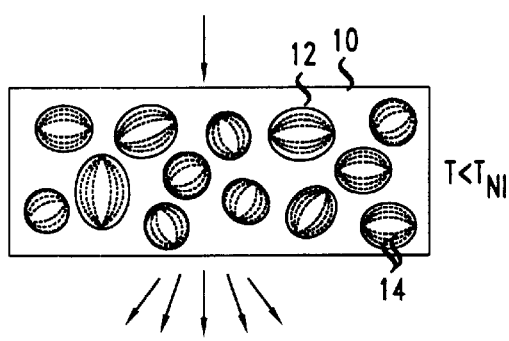
Figure 1C:
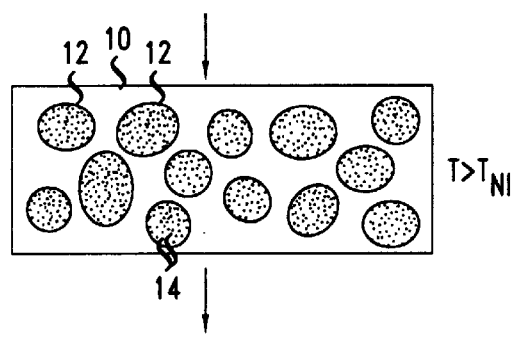
Figure 1D:
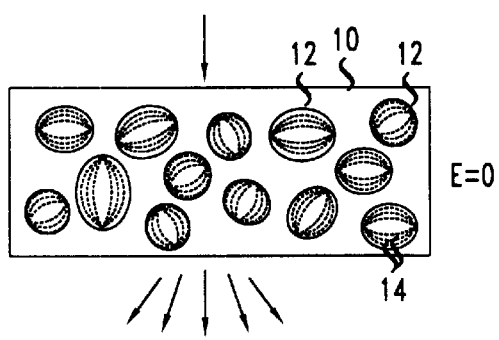
Figure 1E:
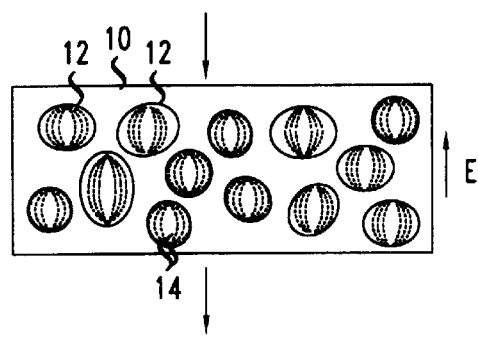

A similar effect, reflected in FIGS. 1D and 1E, is possible by applying an aligning electric field across the PDLC while the liquid crystals 14 are still in the nematic phase. The anisotropic susceptibility of the LC molecules 14 causes the director to align with the field. As shown in FIG. 1D, with no electric field, and the LC in their nermatic phase, incident light encounters a relatively highly scattering cross-section. If an electric field is applied as shown in FIG. 1E, light incident onto the PDLC parallel to the electric field sees a droplet 12 with a refractive index of $n_o$, which matches the index of the polymer 10. It should be noted that the index match due to an electric field is only ideal in the normal-incidence direction, since the LC material remains birefringent. Also, in the case of an electric field above threshold, but below saturation, a partial reorientation of molecules occurs, and therefore a partial re-tuning of the effective droplet refractive index. However, by applying an electric field to a sample elevated to a higher temperature within the nematic phase, the LC viscosity decreases, resulting in lower reorientation fields and faster LC switching times. For this reasons, a combination of electrical and thermal switching is a useful technique. In addition, LC materials also possess an anisotropy in magnetic susceptibility, so analogous molecular tuning and reorientation may be accomplished by appropriate magnetic field switching. Another external variable capable of tuning devices of the invention is pressure, because the scattering cross section is a function of applied pressure for the PDLC materials.

It is possible to perform the switching function using a variety of techniques. Beyond simply changing the ambient thermal environment of the fiber, it is possible to deposit thin layers of patterned metal onto an optical fiber's outer cladding or jacket surface. Application of a current through such a metallic layer leads to resistive heating, rapidly raising the fiber's temperature, e.g., switching times on the order of 1 second for fiber temperature changes of ~100° C. Complex configurations of patterned electrodes is possible, e.g., by printing several electrodes at different azimuthal positions around the fiber. Such complex arrangements make possible simultaneous thermal and electrical switching, with one electrode setting the fiber temperature, and others providing an external aligning field. It is also possible to incorporate electrodes directly within the fiber body, suitable for heating, electric field application, or both. See, e.g., W. Xu, "Evidence of Space-Charge Effects in Thermal Poling," *IEEE Phot. Tech. Lett.*, Vol. 11, No. 10, 1265 (1999). Another potential electrode geometry capable of being combined with on-fiber heating is to confine the relevant segment of fiber between two tightly-spaced planar electrodes. Other suitable configurations will be apparent to one skilled in the art.

Uses of electrophoretic particles, in suspension, are known in the art. Where an electrophoretic dispersion is utilized as the tunable scattering agent in the invention, a useful configuration is imbibing the suspension into one or more axially-oriented air channels running through the cladding of a microstructured fiber. The suspension contains suspended particles of approximately spherical shape, and of a size which gives the maximum scattering effect at the principal wavelength of the transmission system. These particles are able to be moved within the host liquid under the action of an applied electric field. By applying a field of suitable magnitude and polarity across the filled channel, it is possible to induce the suspended particles to cluster, for example, near the cavity surface farthest from the fiber core, or along the surface nearest the fiber core. In the former configuration, the scattering particles would have a relatively weak effect on light propagating in the fiber's core mode, as the overlap of the core mode intensity with these particles located far from the core is low. In the latter configuration, where these high scattering cross-section particles are brought toward the fiber core, and therefore into more effective overlap with the intensity profile of the core mode, the propagating light will experience more significant scattering. It is thereby possible to switch between low and high scattering effects imposed upon light propagating in the fiber. A similar principle allows ordering of the particles in a manner that provides Bragg or long-period gratings in the core. For example, the necessary electric field could be imposed by planar electrodes directly adjacent to the fiber cladding, or between an external electrode and a metal cylindrical electrode running axially within the fiber, or between electrodes deposited as thin metal strips on opposite sides of the fiber cladding.

Figure 2A:
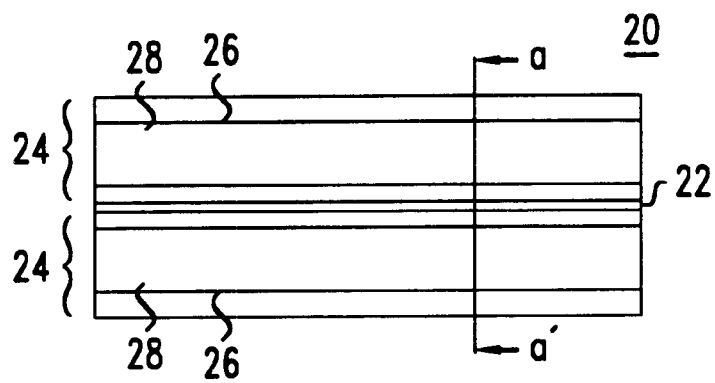
FIGS. 2A and 2B illustrate an embodiment of the invention.
Figure 2B:
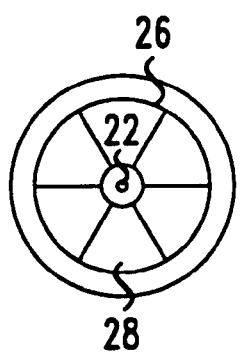
Figure 3A:
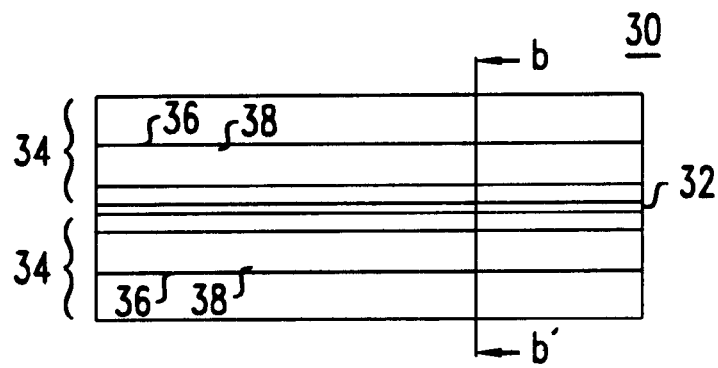
FIGS. 3A and 3B illustrate an embodiment of the invention.
Figure 3B:
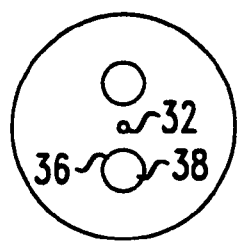
Figure 4A:
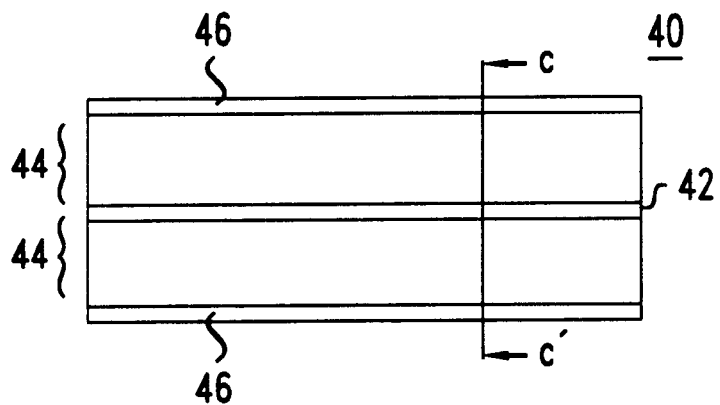
FIGS. 4A and 4B illustrate an embodiment of the invention.
Figure 4B:
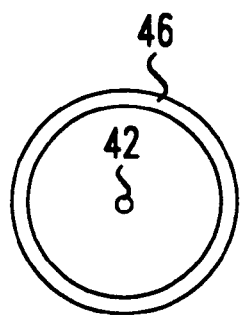

As noted above, the material containing the tunable scattering elements is capable of being disposed within a core region, within a cladding region, or on a cladding region of a waveguide, or any combination of the three. For example, FIGS. 2A and 2B show a microstructured optical fiber 20 having a core region 22 and a cladding region 24. (FIG. 2B shows the cross-section at a–a'.) The cladding region 24 contains six capillary regions 26 that have been filled with a material 28 having scattering elements dispersed therein. FIGS. 3A and 3B show a microstructured optical fiber 30 having a core region 32 and a cladding region 34. (FIG. 3B shows the cross-section at b–b'.) The cladding region 34 contains two capillary regions 36 that have been filled with a material 38 having scattering elements dispersed therein. FIGS. 4A and 4B show a non-microstructured fiber having a core region 42 1and a cladding region 44, with a material 46 having scattering elements dispersed therein formed on the outside of the cladding region 44. (FIG. 4B shows the cross-section at c–c'.) More specific embodiments are discussed below. (For convenience, the invention is described using optical fibers as the waveguide, but the guidelines provided are similarly applicable to other waveguides, e.g., planar waveguides.) Unlike some of the art cited above, the material does not simply undergo a bulk refractive index change throughout (although it may incur some bulk index changes), but undergoes a change in the scattering cross-section. Specifically, the refractive index profile seen by light propagating through the waveguide changes locally, e.g., on a micron-scale. These local changes essentially alter the scattering cross-section of the waveguide, leading to controllable adjustments in the waveguide's properties.

Figure 5A:
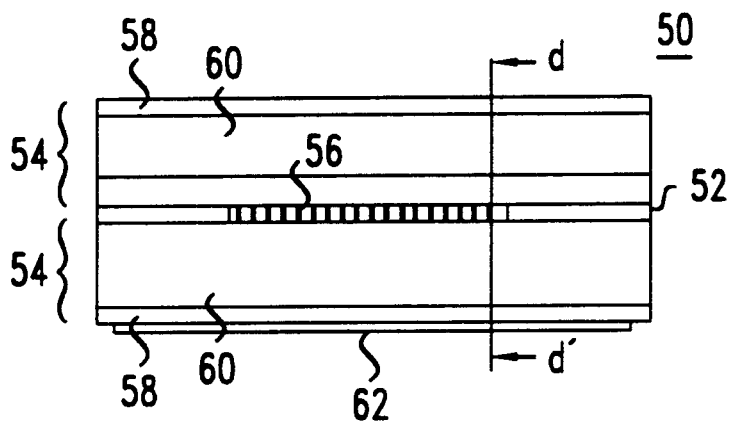
FIGS. 5A and 5B illustrate an embodiment of the invention.
Figure 5B:
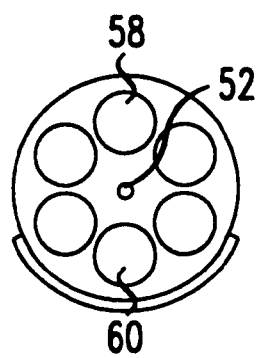

An embodiment of the invention useful with long period gratings is reflected in FIGS. 5A and 5B, with FIG. 5B showing a cross-section at d–d'. LPGs, as discussed for example in co-assigned U.S. Pat. No. 5,999,671 to Jin et al., have a variety of refractive index perturbations spaced at a period that is large relative to the wavelength of the propagating light. LPGs selectively remove light at specific wavelengths by converting the light at those wavelengths from a guided mode to a non-guided mode (e.g., from a core mode to a cladding mode). LPGs are therefore useful as filtering and spectral shaping devices in a variety of applications. One particular use is flattening the gain provided by amplifiers used in wavelength-division multiplexing (WDM) systems. Specifically, the gain profile provided by amplifiers such as erbium-doped amplifiers tends to produce uneven signal amplitudes for different channels of the WDM system. LPGs are able to flatten the gain profile by de-coupling from the core some of the power of wavelengths that lie at the gain peaks.

According to this embodiment, a microstructured fiber 50 is provided having a core region 52 (e.g., a germanium-doped core 10 $\mu$m in diameter), a cladding region 54 (e.g., having an outer diameter of 125 $\mu$m), and six capillary air holes 58 (e.g., each about 40 $\mu$m in diameter) that form a ring (e.g., around a silica region about 32 $\mu$m in diameter). A long-period grating 56 is formed in the fiber, e.g., by deuterium-loading the fiber and then exposing the fiber to UV light through a suitable mask, as known in the art. A typical LPG has a period of 550 µm, with a refractive index modulation of about $10^{-4}$, over a 4-cm section of fiber.

The fiber is then vacuum-imbibed with a PDLC precursor material. A useful PDLC precursor material is an 80:20 volume ratio mixture of Merck TL205 liquid crystal with Merck PN393 prepolymer fluid. Other commercially available or custom-synthesized mixtures are capable of achieving different $n_o$, $n_e$, and $n_{isotropic}$ index values within the liquid-crystal and PDLC mixture, and such mixtures are capable of being designed by one skilled in the art. After imbibing, the PDLC material is generally exposed under UV light, e.g., 365 nm, to provide phase separation and LC droplet formation, i.e., to provide the PDLC material 60. The UV exposure is advantageously symmetric to provide a relatively tight distribution of LC-droplet sizes throughout the imbibed channels in the fiber. A typical irradiance is 5 mW/cm$^2$, with adjustments possible as necessary to generate different mean droplet sizes.

After the PDLC cure, a thin metal film 62 is deposited on one side of the fiber via electron beam evaporation. A useful metal is gold, e.g., 20 nm thick, on top of a titanium adhesion layer, e.g., 2 nm thick, although a variety of metals and thicknesses are possible. Wire leads (not shown) are attached to the metal electrode, e.g., by use of conductive epoxy, and the whole fiber unit is generally placed into a housing to shield it mechanically and from ambient air currents that tend to destabilize thermal addressing.

As discussed above, by applying an appropriate current through the thin film electrode 62, it is possible to bring the fiber temperature up above the nematic-isotropic transition temperature of the liquid crystal in the PDLC-filled channels. As this occurs, the scattering cross-section of the PDLC decreases, i.e., the refractive index of the LC droplets more closely matches the index of the surrounding polymer, and the core mode/cladding mode coupling induced by the LPG is enhanced. In the absence of a applied current, the PDLC material, held within the nematic phase window, tends to induce more scattering and thereby inhibits the core mode/cladding mode coupling. The optical fiber device of this embodiment therefore allows switchable suppression of core mode coupling into cladding modes. The device is useful, for example, as a tunable in-fiber attenuator, with such attenuating characteristics useful as an active gain flattening filter for erbium-doped fiber amplifiers.

Figure 6A:
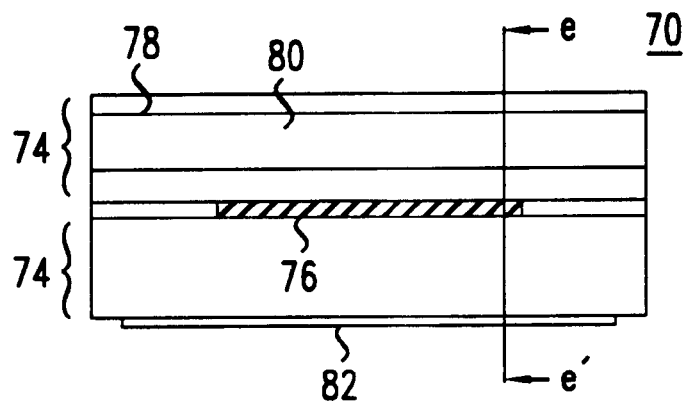
FIGS. 6A and 6B illustrate an embodiment of the invention.
Figure 6B:
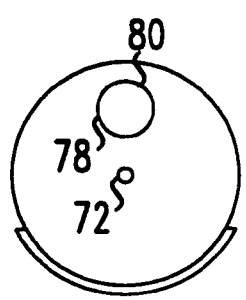

Another embodiment of the invention is shown in FIGS. 6A and 6B, with FIG. 6B being a cross-section at e–e'. This embodiment is useful with blazed Bragg gratings. In a blazed grating, the striations are tilted from the normal to the fiber axis. Blazed gratings are typically used as taps in a variety of optical systems, in that they act to decouple guided modes to non-guided modes, e.g., to tap a portion of propagating light from a fiber. Blazed gratings find particular use in spectrometers used for monitoring channels in WDM systems. See, e.g., co-assigned U.S. Pat. Nos. 5,850,302 and 6,002,822. In some embodiments of such systems, it is useful or necessary to block the tapped light from reaching a detector, and the embodiment of FIGS. 6A and 6B provides a shutter to perform this function.

According to this embodiment, a microstructured optical fiber 70 is provided, the fiber 70 having a core region 72 (e.g., a germanium-doped core 10 µm in diameter), a cladding region 74 (e.g., having an outer diameter of 125 µm), and a single capillary air hole 78 (e.g., about 40 µm in diameter) that is offset (e.g., about 10 µm) from the center of the fiber 70. A blazed grating 76 is formed by conventional techniques, e.g., by deuterium-loading the fiber and then exposing the fiber to UV light through a suitable mask.

The air hole in the fiber is then vacuum-imbibed with PDLC precursor material, and the precursor is then cured to form the PDLC 80, using techniques such as discussed above. And a thin film of metal 82 is formed on a lower region of the fiber, again using a technique such as discussed above. By applying an appropriate current through the gold electrode coating the fiber, the fiber temperature can be brought up above the nematic-isotropic transition temperature of the liquid crystal in the PDLC-filled channel. As this occurs, the scattering cross-section of the PDLC decreases markedly, and the light decoupled from a core mode to a cladding mode is able to travel to the outside of the fiber, where monitoring optics are often placed. In the absence of a applied current, the high scattering of PDLC within the nematic phase window inhibits the penetration of the blazed grating-generated radiation through the filled channel. This optical fiber device therefore provides switchable suppression of radiation modes propagating outward from the core of an optical fiber into which a blazed grating has been written, which, as noted above, is useful in optical channel monitors used in WDM systems.

Figure 7:
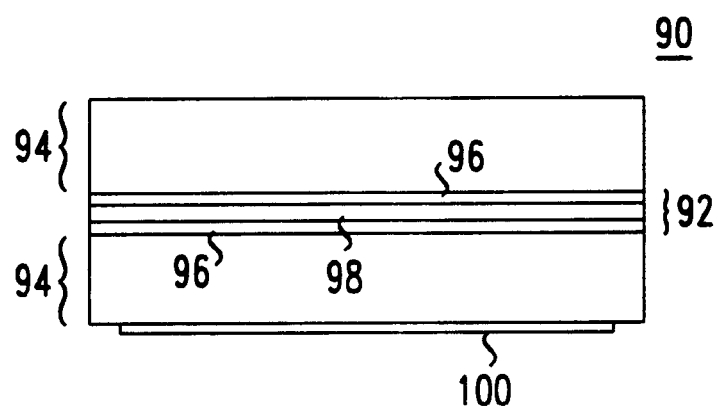
FIG. 7 illustrates an embodiment of the invention.
Figure 8A:
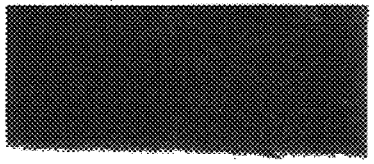
FIGS. 8A to 8E illustrate tunable scattering effects according to the invention.
Figure 8B:
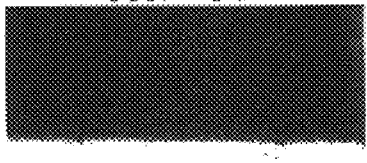
Figure 8C:
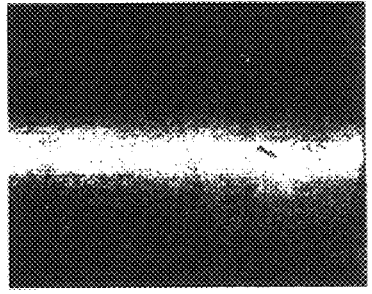
Figure 8D:
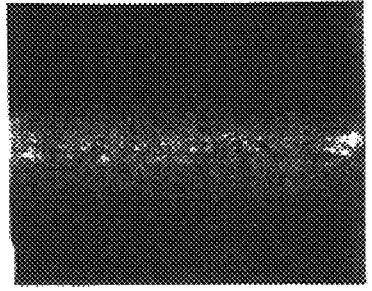
Figure 8E:
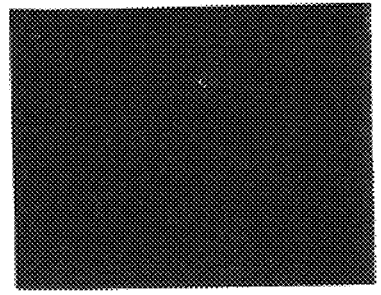

A further embodiment of the invention is shown in FIG. 7. A microstructured fiber 90 is provided, the fiber 90 having a core region 92 and a cladding region 94. The core region 92 contains a hollow air channel 98 (e.g., about 8 µm in diameter) and typically a surrounding germanium-doped region (e.g., such that the overall diameter of the core region is about 14 µm). A fiber Bragg grating or LPG is capable of being formed in the core region, by techniques such as described above. The air channel in the fiber core is vacuum-imbibed with PDLC precursor material, the precursor is cured, and a thin film electrode 100 is formed on at least a portion of the fiber's exterior. The choice of PDLC material, UV curing regime and electrode coating of the fiber are as discussed above.

As with the above embodiments, by applying an appropriate current through the electrode 100, it is possible to bring the fiber 90 temperature above the nematic-isotropic transition temperature of the liquid crystal in the PDLC-filled channel. As this transition occurs, the scattering cross-section of the PDLC decreases, i.e., the LC droplets take on an effective refractive index substantially the same as the surrounding polymer, and the light propagating from an adjacent fiber section or an adjacent device is able to readily couple into the core region 92. By contrast, in the absence of a applied current, the high scattering induced in the nematic phase window will inhibit the coupling of the incoming light into the core region 92. It is thereby possible to achieve switchable suppression of coupling in to the core mode of a fiber, making the device of this embodiment useful as a broadband adjustable in-fiber filter.

A variety of fiber materials, designs, and configurations are possible in the invention, and will depend on the particular application. For example, it is possible to configure the axially oriented elements to provide photonic crystal characteristics. Similarly, as noted above, a variety of materials having scattering elements dispersed therein is possible. In addition, it is possible to control the concentration/profile of the elements in certain regions of the material (either by external manipulation after filling or by particular filling techniques), e.g., such that the material having scattering elements dispersed therein exhibits a periodic variation, or a particular gradient, along the propagation direction, i.e., the scattering cross-section varies along the propagation direction. Also, as noted above, a variety of control techniques are possible, in addition to the temperature control discussed in the above embodiments.

The invention will be further clarified by the following examples, which are intended to be exemplary.

EXAMPLE 1

A silica microstructured fiber was obtained, the fiber having six capillary air holes, each about 40 µm in diameter, arranged in a ring. PDLC precursor was obtained by mixing a multicomponent nematic liquid crystal (TL205, made by Merck, available from EM Industries, New York USA) with a UV-curable monomer plus initiator (PN393, available from Merck, New Jersey USA), in a weight ratio of 80% TL205 to 20% PN393 (due to the densities of these materials, this corresponds to an approximately 80:20 volume ratio, respectively). A cleaved end of the fiber, with the polymer jacket having been stripped, was immersed in the mixed PDLC precursor fluid, and the fluid was imbibed into the microstructure channels with the aid of a vacuum line connected on the other end of the fiber. After filling with the precursor, the fiber was placed between two 365 nm UV lamps, each with an output of ~5 mW/cm$^2$, and irradiated for about 50 minutes to provide a substantially full cure and phase separation of the LC and polymer components. Confocal microscope images of PDLC samples created by this process indicated liquid crystal droplet sizes in the range of 1–2 µm.

After PDLC curing, an approximately 200 nm thick layer of gold was evaporation-deposited on a 2 nm titanium adhesion layer one side of the fiber. Electrode contacts were made by silver-epoxying thin wires onto the gold layer approximately 4 cm apart, giving a measured resistance across the gold of about 30 ohms. The gold-coated section of the PDLC fiber was placed on top of a microscope stage, inside a glass housing designed to shield it from ambient air currents. The fiber was imaged at 20× magnification under crossed polarizers, with polarizer orientation chosen to minimize the effect of the inherent fiber glass birefringence. By applying a known current across the relevant section of filled fiber, and simultaneously measuring the fiber resistance (using a Keithley 2400 Sourcemeter), it was possible to monitor the degree of birefringence and scattering in the PDLC-filled region as a function of fiber temperature (using a resistance to temperature conversion). A series of images under the crossed polarizers is shown in FIGS. 8A to 8E. FIGS. 8A, 8B, 8C, 8D, and 8E illustrate, respectively, temperatures of 25° C., 65° C., 79° C., 82° C., and 85° C. As the fiber was brought above the liquid-crystal nematic-isotropic transition, which was about 85° C., the field of view (FIG. 8E) turned completely black, indicating the transition to an isotropic and, for this PDLC, a less-scattering configuration inside the fiber channels.

Figure 9A:
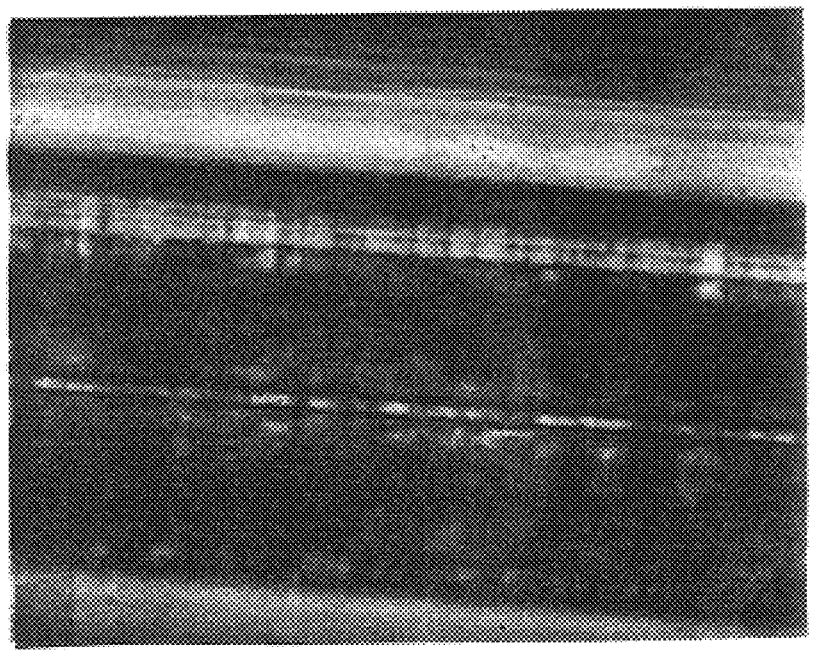
FIGS. 9A and 9B illustrate tunable scattering effects according to the invention.
Figure 9B:
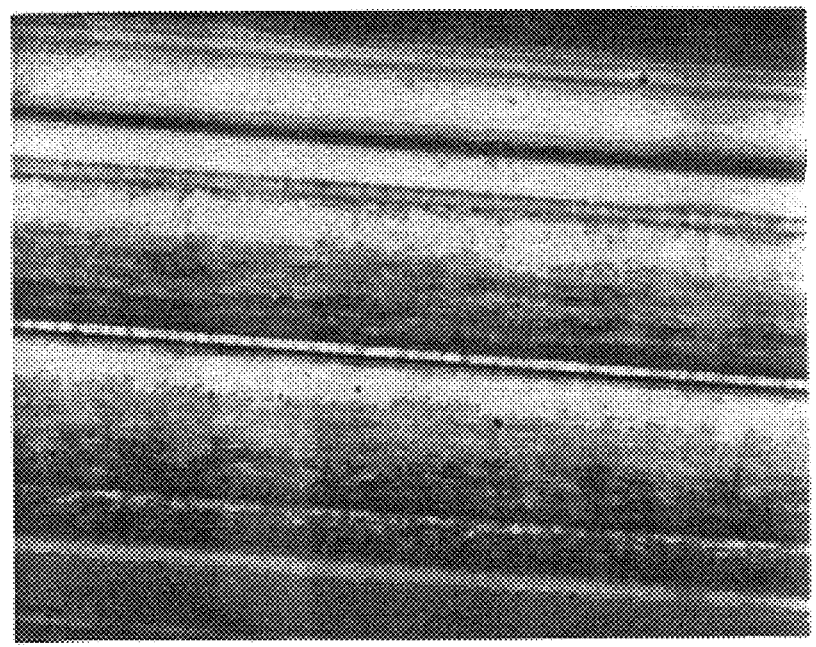
Figure 10:
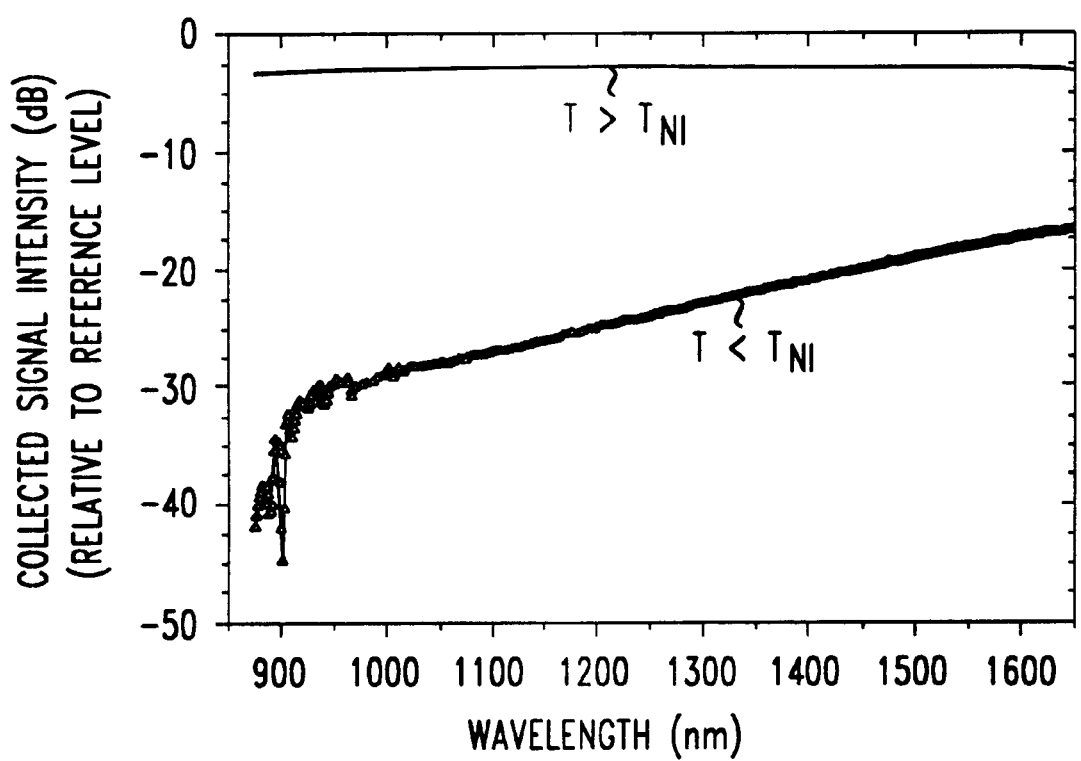
FIG. 10 illustrates tunable scattering effects according to the invention.

Under the crossed polarizers, the reduction in scattering can be inferred because of the better index match known to occur between the polymer and LC droplets above $T_{NI}$, as represented in FIG. 1B. A more direct view of this match is shown by FIGS. 9A and 9B, which show a fiber filled as described above, but without a gold electrode (which inhibited viewing). The fiber was instead placed on a hot stage, with uncrossed polarizers. FIG. 9A shows the fiber at a temperature below the transition temperature of 85° C., and FIG. 9B shows the fiber at a temperature above 85° C. A significant lightening of the fiber is seen in FIG. 9B.

EXAMPLE 2

A fiber having PDLC-filled air holes was formed according to Example 1. After curing of the PDLC precursor, the fiber was confined between two 6-mil thick glass pieces, each coated on its fiber-facing side with about 20 nm of gold over a titanium adhesion layer. This assembly was placed on a microscope stage and viewed at 20× magnification under crossed polarizers as an electric field was applied. With a field of roughly 1.2 V/µm applied, greater light throughput was observed in the PDLC-filled regions. This corresponded to partial liquid-crystal reorientation, decreasing the overall scattering cross section, and increasing light transmission. Because the LC material remains birefringent in this experiment, the net result of the reduced scattering and increased throughput of light is a brighter image seen through crossed polarizers, as observed.

EXAMPLE 3

A mixture of liquid crystal (E7, obtained from Merck, New Jersey USA) and UV-curable polymer (type "65", obtained from Norland, NJ, USA) was made. The specific weight ratio used was 65% E7 to 35% Norland 65. The PDLC precursor was imbibed between two indium tin oxide-coated (ITO) glass plates. The spacing between the ITO glass plates was about 15 microns, as provided by glass spacers. Phase separation of the liquid crystal into droplets within the polymer was achieved by exposing the cell to UV radiation.

A reference level of reflected light was determined as follows: Light from a broadband source was coupled into an optical fiber, directed out of the fiber through a collimating lens, and bounced off a mirror placed flat on top of a hot stage. The reflected light was collected by a second lens/fiber unit, and was directed into a near-infrared, PC-based spectrometer from Control Development. The measurement of the light bouncing directly off the-mirror was taken as the reference level (i.e. 100%, or 0 dB).

The PDLC cell was then placed on top of the mirror, such that the cell's temperature could be raised by adjusting the output of the underlying hot stage. The light from the broadband source was similarly directed at the PDLC cell in two situations: (a) the PDLC cell at room temperature, with the LC in the nematic phase, and (b) the cell heated above 58° C., which is the nematic to isotropic transition temperature ($T_{NI}$) for the E7 liquid crystal. FIG. 9 shows the results for T<$T_{NI}$ and T>$T_{NI}$. As described above when the liquid-crystal is in the nematic phase, local refractive index variations are experienced by light traveling through the PDLC, causing strong scattering. In this example, light incident onto the PDLC cell while the temperature was in the nematic phase region was unable to reflect off the mirror and into the collection optics, as shown by the low level of signal intensity in FIG. 9. Above $T_{NI}$, the liquid crystal loses its birefringence, and the refractive index in the PDLC is substantially uniform. As shown in the top curve in FIG. 9, much more light was therefore able to be reflected by the mirror under the PDLC cell. In particular, at 1.55 µm, a wavelength of particular importance in optical fiber communications, there is an approximately 15 dB increase in transmitted light intensity that occur's when the liquid crystal is heated above $T_{NI}$. This effect was due to the reduction of the scattering cross section in the sample. Although there is a small bulk refractive index change associated with heating of the polymer and liquid crystal, such a bulk index change would not itself alter the amount of light transmitted by the PDLC cell in such a significant fashion.

Other embodiments of the invention will be apparent to those skilled in the art from consideration of the specification and practice of the invention disclosed herein.

What is claimed is:

1. An article comprising a waveguide that comprises a core region, a cladding region, and a solid or liquid material having tunable scattering elements randomly and aperiodically dispersed therein, the material disposed at one or more locations selected from within the core re-ion, within the cladding region, and on the exterior of the cladding region, wherein the tunable scattering elements are capable of being manipulated to provide local refractive index variations on a micron scale and are sized to be sufficiently large so as to effect significant scattering at a lightwave communication wavelength transmitted through the waveguide.

2. The article of claim 1, wherein the waveguide is an optical fiber.

3. The article of claim 2, wherein the optical fiber is a microstructured fiber having one or more axially oriented elements formed therein.

4. The article of claim 3, wherein the material having tunable scattering elements dispersed therein is disposed in at least one of the one or more axially oriented elements.

5. The article of claim 4, wherein the material having tunable scattering elements dispersed therein comprises polymer-dispersed liquid crystal.

6. The article of claim 4, wherein the material having tunable scattering elements dispersed therein comprises electrophoretic particles in a liquid medium.

7. The article of claim 4, wherein the axially oriented elements are configured to provide photonic crystal characteristics.

8. The article of claim 1, wherein the core region comprises a grating element.

9. The article of claim 8, wherein the grating element is a Bragg grating or a long period grating.

10. The article of claim 8, wherein the length of the waveguide in which the grating element is located comprises at least part of the material having tunable scattering elements dispersed therein.

11. The article of claim 8, wherein the grating element couples propagating core modes into cladding modes, and wherein at least one of the axially oriented elements comprising the material having tunable scattering elements dispersed therein is configured such that tuning the scattering elements affects the extent of the coupling.

12. The article of claim 8, wherein the grating element is a blazed Bragg grating that taps light from propagating core modes, and wherein at least one of the axially oriented elements comprising the material having tunable scattering elements dispersed therein is configured such that tuning the scattering elements affects the amount of tapped light that exits the cladding region of the waveguide.

13. The article of claim 1, wherein the core region comprises a photosensitive material such that refractive index modulations are capable of being written into the core region.

14. The article of claim 1, wherein the material having tunable scattering elements dispersed therein comprises polymer-dispersed liquid crystal.

15. The article of claim 1 wherein the tunable scattering elements have an average size about 0.2 to about 10 times the lightwave communication wavelength transmitted through the waveguide.

16. The article of claim 1, wherein at least a portion of the waveguide comprising the material having scattering elements dispersed therein exhibits or is capable of exhibiting a gradient in the scattering cross-section along the direction of propagation.

17. The article of claim 1, wherein the local refractive index variation provided by the scattering elements is controlled by at least one parameter selected from the group consisting of electric field, temperature, magnetic field, and pressure.

18. A system comprising:

a source, and a waveguide transmissively coupled to the source, wherein the source launches one or more wavelengths of light into the waveguide, wherein the waveguide comprises a core region, a cladding region, and a solid or liquid material having tunable scattering elements randomly and aperiodically dispersed therein, wherein the material is disposed at one or more locations selected from within the core region, within the cladding region, and on the exterior of the cladding region, and wherein the tunable scattering elements are sized to be sufficiently large so as to effect significant scattering at the one or more wavelengths of the launched light.

19. The system of claim 18, wherein the tunable scattering elements have an average size about 0.2 to about 10 times the mean wavelength of the launched light.

* * * * *